United States Patent
Struble et al.

(10) Patent No.: US 6,189,929 B1
(45) Date of Patent: Feb. 20, 2001

(54) ADAPTIVE COLLAPSIBLE STEERING COLUMN

(75) Inventors: Rex R. Struble, Clarkston; Ernst M. Faigle, Dryden, both of MI (US)

(73) Assignees: TRW Inc.; TRW Vehicle Safety Systems Inc., both of Lyndhurst, OH (US)

(*) Notice: Under 35 U.S.C. 154(b), the term of this patent shall be extended for 0 days.

(21) Appl. No.: 09/431,997

(22) Filed: Nov. 2, 1999

(51) Int. Cl.[7] ..................................................... B62D 1/11
(52) U.S. Cl. ............................................. 280/777; 74/492
(58) Field of Search ................................... 280/777, 775; 74/493, 492; 188/371, 372, 374

(56) References Cited

U.S. PATENT DOCUMENTS

| | | | |
|---|---|---|---|
| 2,578,903 | * 12/1951 | Smith | 188/374 |
| 4,886,295 | 12/1989 | Browne . | |
| 5,286,056 | 2/1994 | Speich . | |
| 5,375,881 | 12/1994 | Lewis . | |
| 5,378,021 | 1/1995 | Yamaguchi et al. . | |
| 5,517,877 | * 5/1996 | Hancock | 74/492 |
| 5,669,633 | * 9/1997 | Naff et al. | 280/777 |
| 5,788,278 | * 8/1998 | Thomas et al. | 280/777 |
| 6,044,725 | * 4/2000 | Ganser | 74/492 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An apparatus for supporting a steering wheel (22) of a vehicle (10) comprises a first steering column part (32) supported for movement relative to a second steering column part (34). An energy absorbing device (20) is interposed between the first steering column part (32) and the second steering column part (34) for resisting movement of the first part relative to the second part. The energy absorbing device (20) comprises at least one bendable strap (50) that bends to absorb energy in response to relative movement between the first steering column part (32) and the second steering column part (34). A member (70) is movable across the width of the at least one bendable strap (50) to vary the rate of bending of the at least one bendable strap to vary the resistance to movement of the first steering column (32) part relative to the second steering column part (34).

12 Claims, 2 Drawing Sheets

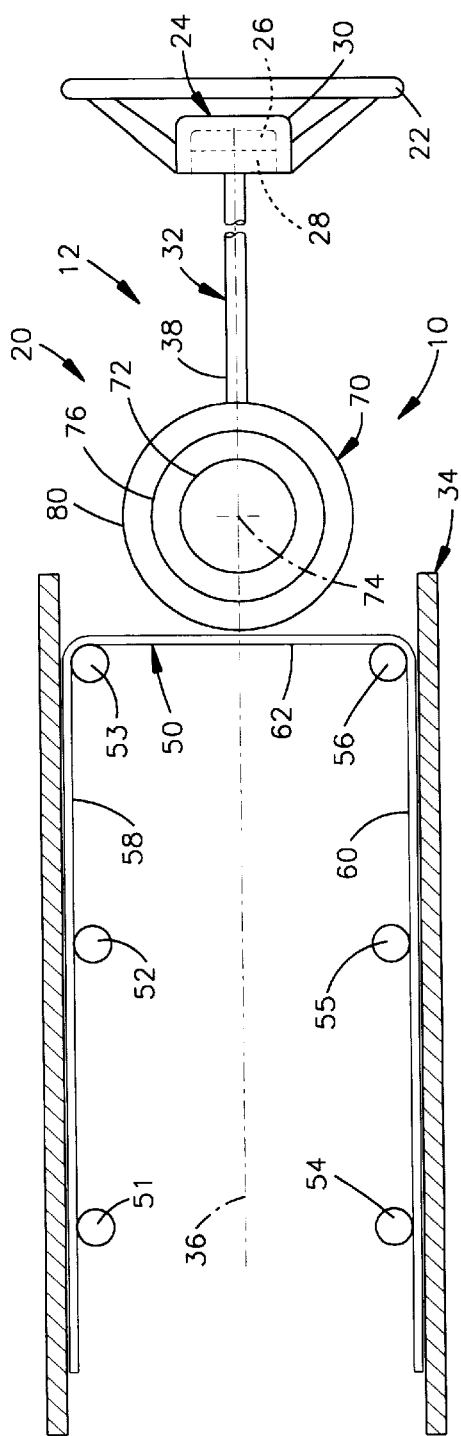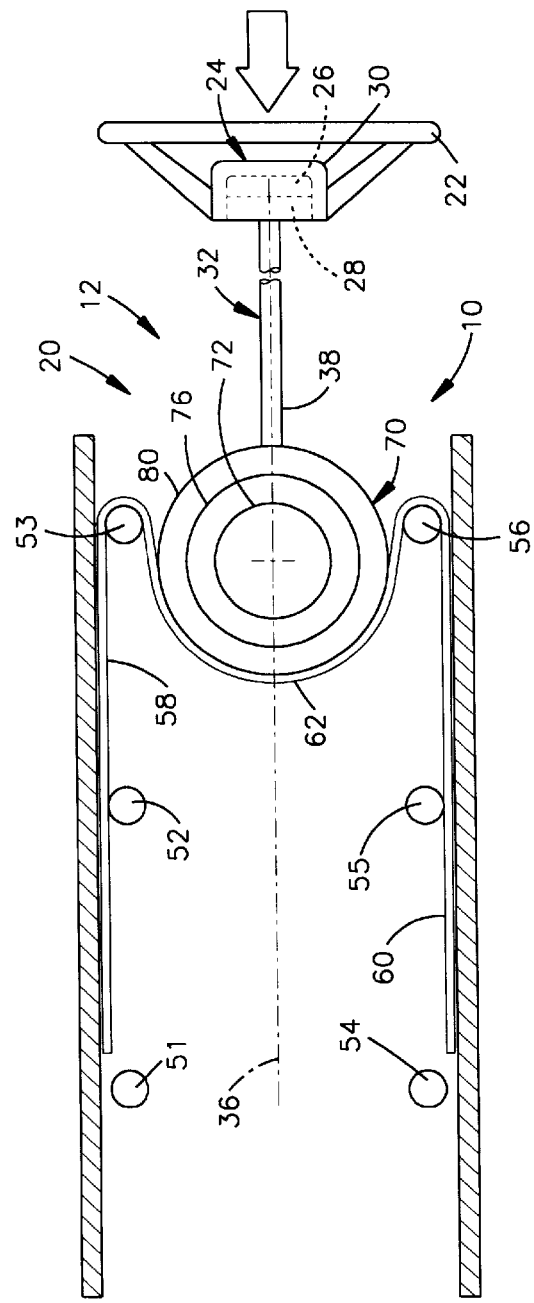

ADAPTIVE COLLAPSIBLE STEERING COLUMN

BACKGROUND OF THE INVENTION

1. Technical Field

The present invention relates to an energy absorbing device for a collapsible steering column in which the resistance to collapsing can be varied.

2. Description of the Prior Art

U.S. Pat. No. 4,886,295 describes a vehicle occupant protection system including a collapsible steering column. An energy absorber is located between two relatively movable sections of the steering column. The energy absorber includes an inflatable bag. The vehicle has electric circuitry, including sensors for sensing vehicle and occupant conditions, that controls the state of inflation of the inflatable bag to vary the energy absorbing capacity of the steering column.

U.S. Pat. No. 5,286,295 describes an energy absorbing device for a vehicle steering column. The device is located between two relatively movable sections of the steering column. The device includes a strap that bends to absorb energy upon relative movement of the two sections of the steering column.

SUMMARY OF THE INVENTION

The present invention is an apparatus for supporting a steering wheel of a vehicle. The apparatus comprises a first steering column part and a second steering column part. The first steering column part and the vehicle steering wheel are supported for movement relative to the second steering column part. The apparatus includes an energy absorbing device interposed between the first steering column part and the second steering column part for resisting movement of the first part relative to the second part. The energy absorbing device comprises at least one bendable strap that bends to absorb energy in response to relative movement between the first steering column part and the second steering column part. A member is movable across the width of the at least one bendable strap to vary the rate of bending of the at least one bendable strap to vary the resistance to movement of the first steering column part relative to the second steering column part.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of an apparatus including an energy absorbing device constructed in accordance with the present invention, shown in an unactuated condition;

FIG. 2 is a view similar to FIG. 1 showing the energy absorbing device in a first actuated condition;

DETAILED DESCRIPTION OF EMBODIMENTS OF THE INVENTION

The present invention relates to an energy absorbing device for a collapsible steering column in which the resistance to collapsing under load can be varied. As representative of the present invention, FIG. 1 illustrates schematically a portion of a vehicle 10 that includes a steering column 12. The steering column 12 is a collapsible steering column that incorporates an energy absorbing device 20 in accordance with the invention.

Figure 3:
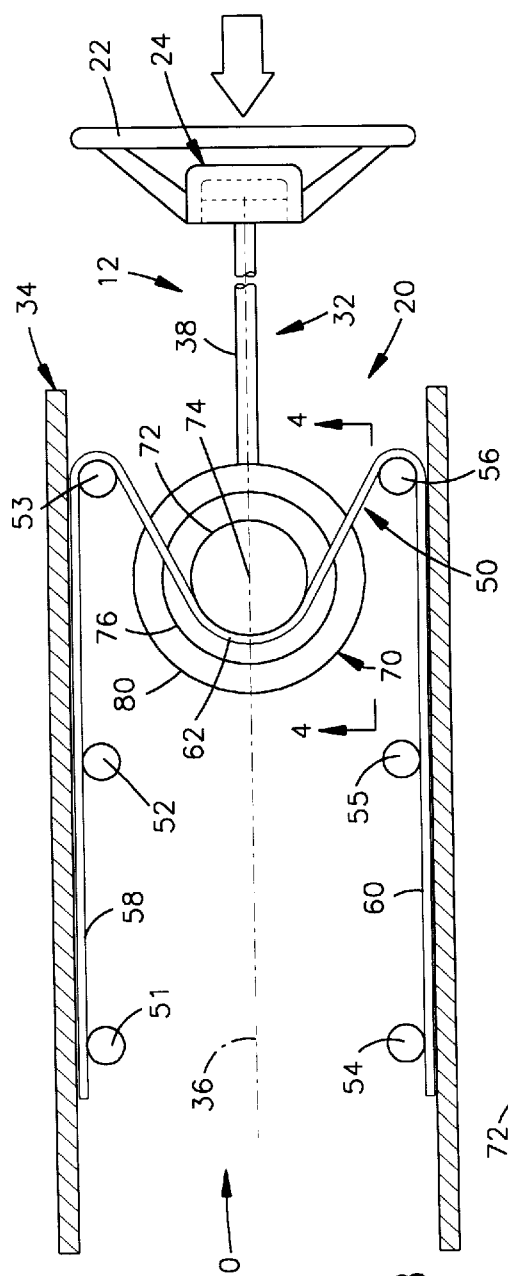
FIG. 3 is a view similar to FIG. 2 showing the energy absorbing device in a second actuated condition.

The vehicle 10 includes a steering wheel 22 (shown at reduced scale in FIGS. 1–3) for effecting directional control of the vehicle. An air bag module 24 is mounted on the steering wheel 22. The air bag module 24 includes an air bag 26 and an inflator 28 within a cover 30. The cover 30 is adapted to open easily upon inflation of the air bag 26.

The steering wheel 22 is supported on the steering column 12 of the vehicle 10. The steering column 12 includes a first steering column part 32 that is movable relative to a second steering column part 34 along an axis 36 of the steering column.

The first steering column part 32 includes a shaft 38 (shown at reduced scale in FIGS. 1–3) that extends along the axis 36. The steering wheel 22 is supported on the shaft 38 for rotation with the shaft. The second steering column part 34, only a portion of which is shown, is fixed to the vehicle structure. One or more bearings and/or other structure (not shown) support the first steering column part 32 for movement relative to the second steering column part 34.

The shaft 38 rotates upon rotation of the steering wheel 22. In the event of sudden vehicle deceleration, if the driver of the vehicle 10 contacts the steering wheel 22 with sufficient force, the first part 32 of the steering column 12 is movable axially relative to the second part 34, in a known manner, to collapse the steering column and thereby to reduce the load on the river.

The energy absorbing device 20 is interposed between the first and second parts 32 and 34. The energy absorbing device 20 controls movement of the first part 32 relative to the second part 34 upon collapsing of the steering column 12.

The energy absorbing device 20 includes a strap 50. The strap 50 is made from a stiff but ductile material, such as steel or aluminum. The energy absorbing device 20 also includes six guide posts 51, 52, 53, 54, 55, and 56. The guide posts 51–56 are fixed in position on the second part 34 of the steering column 12.

A first end portion 58 of the strap 50 extends between the three guide posts 51–53 and the second steering column part 34. The first end portion 58 extends along a linear path between the guide post 51 and the guide post 53.

A second end portion 60 of the strap 50 extends between the other three guide posts 54–56 and the second steering column part 34. The second end portion 60 extends along a linear path between the guide post 54 and the guide post 56.

A central or intermediate portion 62 of the strap 50 extends between the posts 53 and 56. The central portion 62 of the strap 50 extends generally perpendicular to the first end portion 58 and the second end portion 60, in a direction transverse to the axis 36. Thus, the strap 50 bends at about a ninety degree angle as it extends around the guide post 53 between the first end portion 58 and the intermediate portion 62. Similarly, the strap 50 bends at about a ninety degree angle as it extends around the guide post 56 between the second end portion 60 and the intermediate portion 62.

The energy absorbing device 20 also includes a movable member in the form of a pin 70. The pin 70 is preferably made from metal. The pin 70 is connected, in a manner indicated schematically at, with the first part 32 of the steering column 12. As a result, the pin 70 is movable with the first part 32 of the steering column 12 relative to the second part of the steering column 34 upon collapsing of the steering column 12 as described above.

The pin 70 has a cylindrical first portion 72 centered on an axis 74 of the pin. The first portion 72 has a first diameter. The pin 70 has a cylindrical second portion 76 centered on the axis 74. The second portion 76 has a second diameter that is larger than the diameter of the first portion 72 of the pin 70. A first frustoconical portion 78 of the pin 70 extends between the cylindrical first portion 72 and the cylindrical second portion 76 of the pin 70.

The pin 70 has a cylindrical third portion 80 centered on the axis 74. The third portion 80 has a third diameter that is larger than the diameter of the second portion 76 of the pin 70 and, thus, even larger than the diameter of the first portion 72 of the pin. A second frustoconical portion 82 of the pin 70 extends between the cylindrical second portion 76 and the cylindrical third portion 80 of the pin.

A shaft 90 extends axially from the third portion 80 of the pin 70, in a direction away from the first and second portions 72 and 76 of the pin. The shaft 90 is connected in a manner not shown with a motor shown schematically at 92. The motor 92 is a device capable of imparting force to the shaft 90 to move the pin 70 in a direction along the axis 74. The motor 92 may be a stepper motor, a linear electric motor, a fluid motor, a solenoid, or any other such device. The operation of the motor 92 is controlled by a controller 94, which is preferably a microprocessor, as described below in detail.

The pin 70 is in engagement with the central portion 62 of the strap 50. When the parts of the energy absorbing device 20 are in the condition shown in FIG. 1, the pin 70 is positioned along the axis 74 so that the largest diameter third portion 80 of the pin is in abutting engagement with the central portion 62 of the strap 50.

The vehicle 10 includes one or more occupant condition sensors indicated schematically at 96. The occupant condition sensors 96 may be any of several known types. The occupant condition sensors 96 are operative to sense the position of the driver relative to the steering wheel 22, or the size or weight of the driver, and to provide an appropriate output signal indicated schematically at 98.

The vehicle 10 also includes one or more vehicle condition sensors 66 indicated schematically at 100. The vehicle condition sensors 100 may be any of several known types. For example, one of the vehicle condition sensors 100 may be a vehicle speed sensor, or a deceleration sensor such as a mechanical inertia switch or an electrical accelerometer. One of the vehicle condition sensors 100 may also be a proximity sensor such as a radar unit that senses the distance between the vehicle 10 and an object in front of the vehicle. The vehicle condition sensors 100 provide an appropriate output signal indicated schematically at 102.

The controller 94 is operatively connected to the vehicle condition sensors 96 and to the occupant condition sensors 100. The controller 94 incorporates one of several crash algorithms known in the art for discriminating between deployment and non-deployment crash conditions and, in response, determining whether to deploy the air bag 26.

Specifically, in the event of a deployment crash condition involving sudden vehicle deceleration, or other event for which protection of the vehicle occupant may be desired, the sensors 96 and 100 provide appropriate output signals that are inputs to the controller 94. The controller 94 compares the outputs of the sensors 96 and 100 with outputs found in a look-up table, for example. Depending on the outcome of this comparison, the controller 94 determines whether or not to actuate the inflator 28 and deploy the air bag 26.

The controller 94 also controls the operation of the energy absorbing device 20 in response to the outputs of the vehicle condition sensors 96 and the occupant condition sensors 100. Control of the energy absorbing device 20 may be responsive to the vehicle crash severity or any other vehicle condition sensed by the vehicle condition sensors 96. It may also be responsive to the size, weight, and/or position of the driver, or to any other factor which may be useful in determining how much resistance the steering column 12 should offer under load.

During operation of the vehicle 10 before the onset of a crash condition, the controller 94 periodically checks the outputs of the vehicle condition sensors 96 and the occupant condition sensors 100, and adjusts or presets the axial position of the pin 70 relative to the strap 50.

For example, if the vehicle is moving at a relatively high rate of speed, or upon sensing the relatively close proximity of an object in front of the vehicle 10, the controller 94 can position the pin 70 so that the largest diameter third portion 80 of the pin is in engagement with the central portion 62 of the strap 50. This positioning of the pin 70 increases the angle at which the strap 50 bends around each of the two guide posts 53 and 56 if the pin should begin to move between the two guide posts. The increase in angle makes it more difficult for the strap 50 to bend around the guide posts 53 and 56. This increases the resistance to collapsing of the steering column 12 under driver load.

The controller 94 also uses sensed occupant conditions to determine, during operation of the vehicle 10, how to set the position of the pin 70. For example, if the driver is relatively close to the steering wheel 22, or is relatively small or light in weight, then the controller 94 can move the pin 70 axially so that the smallest diameter first portion 72 of the pin is in engagement with the central portion 62 of the strap 50. This decreases the angle at which the strap 50 bends around each of the two guide posts 53 and 56 if the pin 70 should begin to move between the two guide posts. The decrease in angle makes it easier for the strap 50 to bend around the guide posts 53 and 56. This decreases the resistance to collapsing of the steering column 12 under driver load.

In the event of a deployment crash condition involving sudden vehicle deceleration, or other event for which protection of the vehicle occupant may be desired, the sensors 96 and 100 provide appropriate output signals that are inputs to the controller 94, for the purpose of operating the motor 92 to adjust the position of the pin 70. The controller 94 determines, on the basis of these output signals, whether the preset position of the pin 70 is appropriate for the sensed vehicle conditions and occupant conditions. The controller 94 compares the outputs of the sensors 96 and 100 with outputs found in a look-up table, for example. Depending on the outcome of this comparison, the controller 94 determines whether or not to adjust the preset position of the pin 70.

For example, in the event of a sensed crash condition of relatively high severity, the driver will have a relatively large amount of kinetic energy to be absorbed by the energy absorbing device 20. The controller 94 can operate the motor 92 to move the pin 70 axially so that the largest diameter third portion 80 of the pin is in engagement with the strap 50. This position of the pin 70 maximizes the resistance to bending, or deformation, of the strap 50, and thus increases the resistance to collapsing of the steering column 12 under driver load. Alternatively, in the event of a sensed crash condition of relatively low severity, the driver will have a relatively low amount of kinetic energy to be absorbed by the energy absorbing device 20. The controller 94 can operate the motor 92 to move the pin 70 axially so that the smallest diameter first portion 72 of the pin is in engagement with the strap 50. This position of the pin 70 minimizes the resistance to bending, or deformation, of the strap 50, and thus decreases the resistance to collapsing of the steering column 12 under driver load.

As another example, the controller 94 determines at the onset of the crash event whether to change the preset position of the pin 70 on the basis of sensed occupant conditions. For example, if the driver is relatively close to the steering wheel 22, at the onset of the crash event, then the controller 94 can operate the motor 92 to move the pin 70 axially so that the smallest diameter first portion 72 of the pin is in engagement with the strap 50. This position of the pin minimizes the resistance to bending, or deformation, of the strap 50, and thus decreases the resistance to collapsing of the steering column 12 under driver load.

Similarly, if the occupant condition sensors indicate that the driver is relatively far from the steering wheel 22 at the onset of the crash condition, then the controller 94 can operate the motor 92 to move the pin 70 axially so that the largest diameter third portion 80 of the pin is in engagement with the strap 50. This position of the pin 70 maximizes the resistance to bending, or deformation, of the strap 50, and thus increases the resistance to collapsing of the steering column 12 under driver load.

Vehicle and occupant conditions can change during the duration of the crash event, in ways that would make it desirable to change the energy absorbing capacity of the energy absorbing device 20. The present invention is advantageous in that the axial position of the pin 70 can be changed within a very short period of time, for example, in a few milliseconds. The sensors 96 and 100 and the controller 94 are operative to sense changing conditions during the crash event and adjust position of the pin 70 accordingly during the crash event. As a result, the resistance to collapsing of the steering column 12 can be varied during the duration of the crash event, instead of just once at the onset of the crash event, to provide more optimal driver protection.

Figure 5:
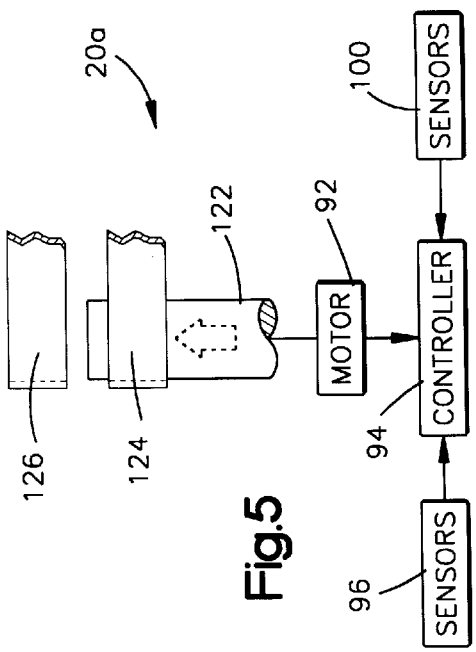
FIG. 5 is a schematic illustration of an apparatus including an energy absorbing device constructed in accordance with a second embodiment of the present invention.
Figure 4:
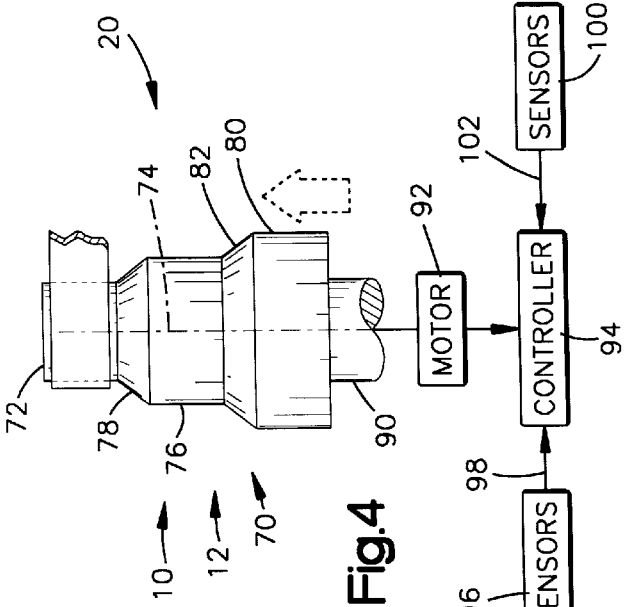
FIG. 4 is a schematic sectional view taken generally along line 4—4 of FIG. 3.

FIG. 5 illustrates a portion of an energy absorbing device 120 in accordance with as second embodiment of the invention. The energy absorbing device is generally similar in construction to the energy absorbing device 120 and can be substituted in the vehicle 10 for the energy absorbing device 120 of the first embodiment.

In the energy absorbing device 120, the motor 92, controller 94, and sensors 96 and 100 are operative to move a pin 122 axially. The pin 122 has a constant diameter, rather than having plural diameters like the pin 70 (FIGS. 1–4). The energy absorbing device 120, on the other hand, includes a plurality of straps rather than only one strap. Specifically, the energy absorbing device 120 illustrated in FIG. 5 includes a first strap 124 and a second strap 126 located adjacent each other in the energy absorbing device.

The pin 122 is always in engagement with the first strap 124. The motor 92 is selectively operative, by the controller 94, to move the pin 122 into engagement with the second strap 126 also.

The controller 94 positions the pin 122 axially so that it is in engagement with only the first strap 214 when relatively less resistance to driver load is desired. When the pin is in engagement with only the first strap 124, relative movement of the first and second steering column parts (not shown in FIG. 5) causes bending of the first strap 124 about the guide posts. This provides a first amount of resistance to relative movement of the first and second steering column parts.

The controller 94 positions the pin 122 axially so that it is in engagement with both the first strap 124 and the second strap 126 when relatively more resistance to driver load is desired. When the pin 122 is in engagement with both the first strap 124 and the second strap 126, relative movement of the first and second steering column parts (not shown in FIG. 5) causes bending of both the first strap and the second strap about the guide posts. This provides a second amount of resistance, greater than the first amount of resistance, to relative movement of the first and second steering column parts.

From the above description of the invention, those skilled in the art will perceive improvements, changes and modifications in the invention. For example, a continuously tapered pin (or other movable member) may be used to provide a continuously variable rate of bending of the strap(s). Such improvements, changes and modifications within the skill of the art are intended to be covered by the appended claims.

Having described the invention we claim:

1. An apparatus for supporting a steering wheel of a vehicle, said apparatus comprising:

a first steering column part;

a second steering column part;

said first steering column part and the vehicle steering wheel being supported for movement relative to said second steering column part;

an energy absorbing device interposed between said first steering column part and said second steering column part for resisting movement of said first part relative to said second part, said energy absorbing device comprising at least one bendable strap that bends to absorb energy in response to relative movement between said first steering column part and said second steering column part; and a member movable across the width of said at least one bendable strap to vary the rate of bending of said at least one bendable strap to vary the resistance to movement of said first steering column part relative to said second steering column part.

2. An apparatus as set forth in claim 1 wherein said member has a non-cylindrical configuration including a first portion engageable with said at least one bendable strap to cause said at least one bendable strap to bend at a first rate, and a second portion engageable with said at least one bendable strap to cause said at least one bendable strap to bend at a second rate different from the first rate.

3. An apparatus as set forth in claim 1 wherein said at least one bendable strap comprises first and second bendable straps located adjacent each other in said energy absorbing device, said member being movable between a first position in engagement with only said first strap to provide a first level of resistance to movement of said first steering column part relative to said second steering column part, and a second position in engagement with both said first strap and said second strap to provide a second level of resistance greater than said first level to movement of said first steering column part relative to said second steering column part.

4. An apparatus as set forth in claim 1 wherein the rate of bending of said at least one bendable strap varies in response to sensing of at least one vehicle and/or occupant condition sensed during operation of the vehicle.

5. An apparatus as set forth in claim 1 wherein the vehicle steering wheel supports an air bag module including an inflator and an air bag, said apparatus further comprising at least one sensor for sensing at least one vehicle and/or occupant condition during operation of the vehicle to control inflation of said air bag.

6. An apparatus as set forth in claim 5 wherein the rate of bending of said at least one bendable strap varies in response to sensing of said at least one vehicle and/or occupant condition.

7. An apparatus for supporting a steering wheel of a vehicle, said apparatus comprising:

a first steering column part;

a second steering column part;

said first steering column part and the vehicle steering wheel being supported for movement relative to said second steering column part;

an energy absorbing device interposed between said first steering column part and said second steering column part for resisting movement of said first part relative to said second part, said energy absorbing device comprising at least one bendable strap that bends to absorb energy in response to relative movement between said first steering column part and said second steering column part; and means responsive to vehicle and/or occupant conditions sensed during operation of the vehicle for varying the rate of bending of said at least one bendable strap to vary the resistance to movement of said first steering column part relative to said second steering column part.

8. An apparatus as set forth in claim 7 wherein said means for varying comprises a member engageable with and movable relative to said at least one strap for varying the rate of bending of said at least one strap.

9. An apparatus as set forth in claim 8 wherein said member has a non-cylindrical configuration including a first portion engageable with said at least one bendable strap to cause said at least one bendable strap to bend at a first rate, and a second portion engageable with said at least one bendable strap to cause said at least one bendable strap to bend at a second rate different from the first rate.

10. An apparatus as set forth in claim 8 wherein said at least one bendable strap comprises first and second bendable straps located adjacent each other, said member being movable between a first position in engagement with only said first strap to provide a first level of resistance to movement of said first steering column part relative to said second steering column part and a second condition in engagement with both said first strap and said second strap to provide a second level of resistance greater than said first level to movement of said first steering column part relative to said second steering column part.

11. An apparatus as set forth in claim 8 wherein said means for varying the rate of bending of said at least one bendable strap comprises a sensor for sensing at least one vehicle and/or occupant condition and a controller operatively connected with said at least one sensor for controlling the position of said movable member relative to said at least one strap.

12. An apparatus as set forth in claim 8 wherein the vehicle steering wheel supports an air bag module including an inflator and an air bag, said means for varying comprising a controller that controls the rate of bending of said at least one bendable strap and also controls inflation of said air bag.

* * * * *